(12) United States Patent
Watanabe

(10) Patent No.: US 8,215,226 B2
(45) Date of Patent: Jul. 10, 2012

(54) NEGATIVE PRESSURE BOOSTER

(75) Inventor: Satoru Watanabe, Saitama (JP)

(73) Assignee: Bosch Corporation, Tokyo (JP)

( * ) Notice: Subject to any disclaimer, the term of this patent is extended or adjusted under 35 U.S.C. 154(b) by 823 days.

(21) Appl. No.: 12/304,333

(22) PCT Filed: Jun. 11, 2007

(86) PCT No.: PCT/JP2007/062188
§ 371 (c)(1),
(2), (4) Date: Dec. 11, 2008

(87) PCT Pub. No.: WO2007/145348
PCT Pub. Date: Dec. 21, 2007

(65) Prior Publication Data
US 2009/0193964 A1    Aug. 6, 2009

(30) Foreign Application Priority Data

Jun. 12, 2006 (JP) .................................. 2006-162236

(51) Int. Cl.
*B60T 13/57* (2006.01)
*B60T 13/573* (2006.01)

(52) U.S. Cl. ...................................... 91/369.2

(58) Field of Classification Search ................. 91/369.2, 91/376 R
See application file for complete search history.

(56) References Cited

U.S. PATENT DOCUMENTS

| | | | |
|---|---|---|---|
| 5,794,506 A | 8/1998 | Inoue et al. | |
| 6,561,075 B2 * | 5/2003 | Haerr et al. | 91/369.2 |
| 6,755,116 B1 * | 6/2004 | Tsubouchi et al. | 91/369.2 |
| 6,782,794 B2 * | 8/2004 | Takasaki et al. | 91/369.2 |
| 7,685,926 B2 * | 3/2010 | Mori | 91/376 R |
| 2002/0166443 A1 | 11/2002 | Haerr et al. | |
| 2003/0121407 A1 | 7/2003 | Takasaki et al. | |
| 2003/0230931 A1 | 12/2003 | Watanabe et al. | |
| 2006/0207420 A1 | 9/2006 | Mori | |

FOREIGN PATENT DOCUMENTS

| | | |
|---|---|---|
| EP | 1227020 A1 | 7/2002 |
| EP | 1323606 A1 | 7/2003 |
| JP | 11180293 A | 7/1999 |
| JP | 11334573 A | 12/1999 |
| JP | 2000016274 A | 1/2000 |
| JP | 2004017740 A | 1/2004 |
| WO | 2004091989 A1 | 10/2004 |
| WO | 2004101340 A1 | 11/2004 |

* cited by examiner

*Primary Examiner* — Thomas E Lazo
(74) *Attorney, Agent, or Firm* — Ronald E. Greigg

(57) ABSTRACT

In the negative pressure booster, when in operation, a reaction disc (35) deflects due to the reaction from an output shaft (34) and pushes a pin (28) backward, and the pin (28) pushes a vacuum valve seat member (21) backward via an arm (25). Thereafter, the vacuum valve seat member (21) pushes up a valve body (15) backward via a vacuum valve portion (17), and an atmosphere valve portion (16) moves backward relative to a valve body (4). The stroke of an input shaft (11) is shortened by an amount an atmosphere valve (20) and a vacuum valve (23) have moved backward. As the valve body (15) is pushed up backward, further, a balance position for the atmosphere valve (20) and the vacuum valve (23) shifts backward depending upon the output (input). Therefore, the stroke of the input member is shortened at the time of producing a large output.

8 Claims, 4 Drawing Sheets

NEGATIVE PRESSURE BOOSTER

BACKGROUND ART

The present invention relates to a technical field of a negative pressure booster which is used in a brake system or the like. More particularly, the invention relates to a technical field of a negative pressure booster which, in a low output region (low deceleration region), obtains a relatively low output (deceleration G) with a relatively small servo ratio and, in a high output region (high deceleration region), obtains a relatively high output (deceleration G) with a servo ratio larger than the servo ratio in the low output region, to thereby obtain a large output (deceleration G) with a small input (pedal depressing force) and to improve pedal feeling by shortening the pedal stroke.

So far, a brake system of an automobile such as a passenger car is using a negative pressure booster which utilizes a negative pressure as a brake booster. The above conventional generally used negative pressure booster is partitioned by a power piston into a constant pressure chamber into which a negative pressure is introduced by a power piston at all times and a variable pressure chamber in which the pressure varies. When the brake is normally applied by normally depressing the brake pedal, the input shaft moves forward causing a control valve to be changed over, and the atmosphere is introduced into the variable pressure chamber. Then, a pressure difference occurs between the variable pressure chamber and the constant pressure chamber, and the power piston moves forward. Therefore, the negative pressure booster boosts an input of the input shaft (i.e., depressing force of the pedal) at a predetermined servo ratio and outputs it. Due to the output of the negative pressure booster, a master cylinder generates a master cylinder pressure which works to operate wheel cylinders to effect the normal braking operation.

As a conventional negative pressure booster, International Laid-Open WO 2004/101340 is proposing a negative pressure booster which, in a low output region (low deceleration region, normal braking region) smaller than a predetermined output, boosts the input of the input shaft at a relatively small servo ratio to produce a relatively small output, and, in a high output region (high deceleration region) larger than the predetermined output, boosts the input of the input shaft at a servo ratio larger than the servo ratio in the low output region which is smaller than the predetermined output to produce a relatively large output and, further, shortens the stroke of the input shaft to produce a large output without increasing the stroke of the input shaft and, therefore, to obtain good operation feeling.

In the negative pressure booster disclosed in International Laid-Open WO 2004/101340, the vacuum valve is constituted as a moving vacuum valve having a moving vacuum valve seat on which the pressure in the variable pressure chamber of the negative pressure booster acts and on which a spring load, further, acts in a direction opposite to the direction in which the pressure in the variable pressure chamber acts. While the negative pressure booster is in operation, if the pressure in the variable pressure chamber of the negative pressure booster is in a low pressure region of lower than a predetermined pressure, the moving vacuum valve seat does not move since the force for pushing the moving vacuum valve seat based on the pressure in the variable pressure chamber is too small. Therefore, a balance position at which both the vacuum valve and the atmosphere valve close, does not shift relative to the valve body. Therefore, there is no change in the gap between a reaction disc which is reaction means and a valve plunger or the input shaft, and the negative pressure booster effects the boosting operation at a relatively small servo ratio.

Further, if the pressure in the variable pressure chamber of the negative pressure booster is in a high pressure region of higher than the predetermined pressure, the moving vacuum valve seat moves backward (toward the input side) relative to the valve body overcoming the spring load since the force for pushing the moving vacuum valve seat based on the pressure in the variable pressure chamber becomes great. Therefore, the balance position at which both the vacuum valve and the atmosphere valve close, shifts backward relative to the valve body. Therefore, the gap increases between a reaction disc and the valve plunger or the input shaft, and the jumping amount that varies depending upon an increase in the gap works to increase the output. The amount of backward motion of the moving vacuum valve seat increases with an increase in the pressure in the variable pressure chamber and, therefore, the balance position shifts backward relative to the valve body as the pressure in the variable pressure chamber increases. Therefore, the gap, too, increases with an increase in the pressure in the variable pressure chamber, the jumping amount which varies depending upon an increase in the gap works to increase the output accompanying an increase in the pressure in the variable pressure chamber, and the servo ratio becomes greater than that of when the moving vacuum valve seat does not move. According to the negative pressure booster disclosed in the patent document 1, as described above, the timing for changing the servo ratio from a small servo ratio in the low output region over to a large servo ratio in the high output region is controlled, i.e., the timing at which the moving vacuum valve seat starts moving is controlled depending upon the pressure in the variable pressure chamber of the negative pressure booster which is on the input side.

According to the negative pressure booster disclosed in the patent document 1, however, the pressure-receiving area of the moving vacuum valve seat must be increased when it is attempted to easily control the moving vacuum valve seat by reliably operating the moving vacuum valve seat with the pressure in the variable pressure chamber when the pressure in the variable pressure chamber has exceeded the predetermined pressure. If the pressure-receiving area of the moving vacuum valve seat is increased, however, the sealing portion of the moving vacuum valve increases resulting in an increase in the size of the negative pressure booster and, besides, it becomes difficult to produce the moving vacuum valve seat maintaining high precision. Therefore, it is not allowed to so much increase the pressure-receiving area of the moving vacuum valve seat making it relatively difficult to control the moving vacuum valve seat. Besides, since the moving vacuum valve seat is moved by the controlled input pressure, it becomes more difficult to control the timing for starting the motion of the moving vacuum valve seat.

DISCLOSURE OF THE INVENTION

It is an object of the present invention to provide a negative pressure booster which improves the operation feeling by shortening the stroke of an input member at the time of producing a large output, can be compactly formed, and can control the moving vacuum valve seat reliably and easily.

To achieve the above object, a negative pressure booster of the invention comprises a valve body so arranged as to move into and out of a space formed by a shell, and penetrates through the shell air-tightly and slidably; a power piston coupled to the valve body and divides the interior of the space into a constant pressure chamber into which a negative pressure is introduced and a pressure variable chamber into which the atmosphere is introduced when in operation; a valve plunger arranged in the valve body so as to freely move; an input shaft coupled to the valve plunger and is arranged so as to move into and out of the valve body; an output shaft which, due to the operation of the power piston, moves together with the valve body to produce an output; a vacuum valve arranged in the valve body and is controlled by the forward or backward motion of the valve plunger to shut off or communicate the passage between the constant pressure chamber and the variable pressure chamber; an atmosphere valve arranged in the valve body and is controlled by the forward or backward motion of the valve plunger to communicate or shut off the passage between the variable pressure chamber and the atmosphere; and reaction means for transmitting the reaction from the output shaft to the valve plunger; wherein, the vacuum valve and the atmosphere valve have a common valve body, the vacuum valve has a vacuum valve portion provided in the valve body and a vacuum valve seat on which the vacuum valve portion can be detachably seated, and the atmosphere valve has an atmosphere valve portion provided in the valve body and an atmosphere valve seat provided in the valve plunger and on which the atmosphere valve portion can be detachably seated;

wherein the vacuum valve seat is provided on a vacuum valve seat member supported by the valve body so as to slide; a force transmission member is provided so as to move relative to the valve body, the force transmission member pushing the vacuum valve seat member upon receiving a force produced by the reaction means in response to the reaction from the output shaft; and when the pushing force of the force transmission member is larger than a predetermined value, the vacuum valve seat member causes the valve body to open the atmosphere valve due to the pushing force from the force transmission member.

In the negative pressure booster according to the present invention, further, provision is made of vacuum valve seat member-urging means for urging the vacuum valve seat member with an urging force that opposes the pushing force of the force transmission member that pushes the vacuum valve seat member.

In the negative pressure booster according to the present invention, further, the reaction means includes a reaction disc that is deflected by the reaction of the output shaft to transmit the force to the valve plunger, and the force transmission member pushes the vacuum valve seat member upon receiving a force generated by the reaction disc that is deflected by the reaction from the output shaft.

In the negative pressure booster according to the present invention, further, the force transmission member comprises a pin that receives the force from the reaction disc, and an intermediate force transmission member that pushes the vacuum valve seat member upon receiving the force from the pin.

In the negative pressure booster according to the present invention, further, provision is made of quick output increasing means which, when the input shaft is operated quicker than when in the normal operation, increases the output quicker than in the normal operation.

According to the thus constituted negative pressure booster of the invention, the force transmission member receives the force produced by the reaction means in response to the reaction from the output shaft at the time of operation, and pushes the vacuum valve seat member in a direction in which the atmosphere valve portion of the atmosphere valve separates away from the atmosphere valve seat. Therefore, if the pushing force of the force transmission member pushing the vacuum valve seat member exceeds a predetermined value, the force transmission member operates the vacuum valve seat member so that a balance position at where both the atmosphere valve and the vacuum valve are closed is shifted toward the input side relative to the valve body depending upon the pushing force of the force transmission member and that the amount of shift of the balance position increases depending upon the output of the negative pressure booster. Therefore, the servo ratio of the negative pressure booster can be switched from a small servo ratio in the low output region over to a servo ratio in a high output region which is larger than the small servo ratio in the low output region. In the high output region, therefore, a large output is obtained with a relatively small input.

As the vacuum valve seat member moves the valve body backward, further, the position of the atmosphere valve and the position of the vacuum valve at where the input and the output are balanced, shift backward (toward the input side), making it possible to shorten the stroke of the input shaft at the time of producing a large output and to further improve the feeling of input operation.

By using the negative pressure booster of the invention as a brake booster, therefore, in obtaining a large stroke of the output shaft in the intermediate to high deceleration (intermediate to high G) regions, it is made possible to shorten the stroke quantity of the input shaft as compared to the stroke quantity necessary for obtaining the large stroke when the stroke quantity of the input shaft is changed at a change rate of the operation stroke quantity of the input shaft with respect to the output in the low deceleration (low G) region. Accordingly, in obtaining the deceleration larger than the deceleration of when the brake is normally applied in the low deceleration (low G) region, it is made possible to obtain a desired large deceleration with a pedal depressing amount which is smaller than the amount the brake pedal is depressed for obtaining the large deceleration with the servo ratio SR1 of when the brake is normally applied in the low deceleration (low G) region. Accordingly, the brake feeling can be more effectively improved for those vehicles having large weights that require a larger braking force when the brake is normally operated in the intermediate to high deceleration (intermediate to high G) regions than the braking force of when the brake is normally applied in the low deceleration (low G) region.

Further, the timing for starting the operation of the vacuum valve seat member for switching the servo ratio of the negative pressure booster from a small servo ratio over to a large servo ratio, can be controlled depending upon the output of the negative pressure booster. By suitably adjusting the preset urging load of the vacuum valve seat member-urging means, in particular, the timing for starting the operation of the vacuum valve seat member can be set to a desired timing. Therefore, this makes it possible to flexibly and easily cope with negative pressure boosters having various input and output characteristics.

Further, the vacuum valve seat member is operated by the force transmission member that is urged by a force generated by the reaction means responsive to the reaction from the output shaft. Namely, the vacuum valve seat member operates reliably, and can be controlled reliably and easily. Besides, the structure for operating the vacuum valve seat member can be simplified. In particular, by using a pin as the force transmission member, the structure for operating the vacuum valve seat member can be further simplified and can be obtained at a decreased cost.

Upon operating the vacuum valve seat member by the force transmission member, further, the vacuum valve seat member does not have to possess the pressure-receiving area and, therefore, the diameter of the vacuum valve seat member can be decreased. This makes it possible to decrease the diameter of the valve body and, therefore, to fabricate the negative pressure booster as a whole in a compact size.

Further, the vacuum valve seat member having no pressure-receiving area contributes to correspondingly increasing the sectional area of the passage formed in the valve body through which the air flows and to improving the response.

Besides, what are required are to simply add some constituent parts such as pin, intermediate power transmission member and vacuum valve seat member to the reaction disc and the valve plunger constituting the reaction means that has heretofore been used in general negative pressure boosters. Therefore, the structure for operating the vacuum valve seat member is simple and can be easily assembled at a decreased cost.

Moreover, when the input shaft is operated quicker than in the normal operation, the quick output increasing means works to increase the output quicker than that in the normal operation. By using the negative pressure booster of the invention as a brake booster, in particular, the braking force at the time of applying the emergency brake increases quicker than that when normally applying the brake, enabling the emergency brake to be quickly and effectively applied. As described above, the brake assist (BA) control is executed while shortening the pedal stroke of the brake pedal, to attain favorable brake control.

BEST MODE FOR CARRYING OUT THE INVENTION

An embodiment of the invention will now be described with reference to the drawings.

Figure 1:
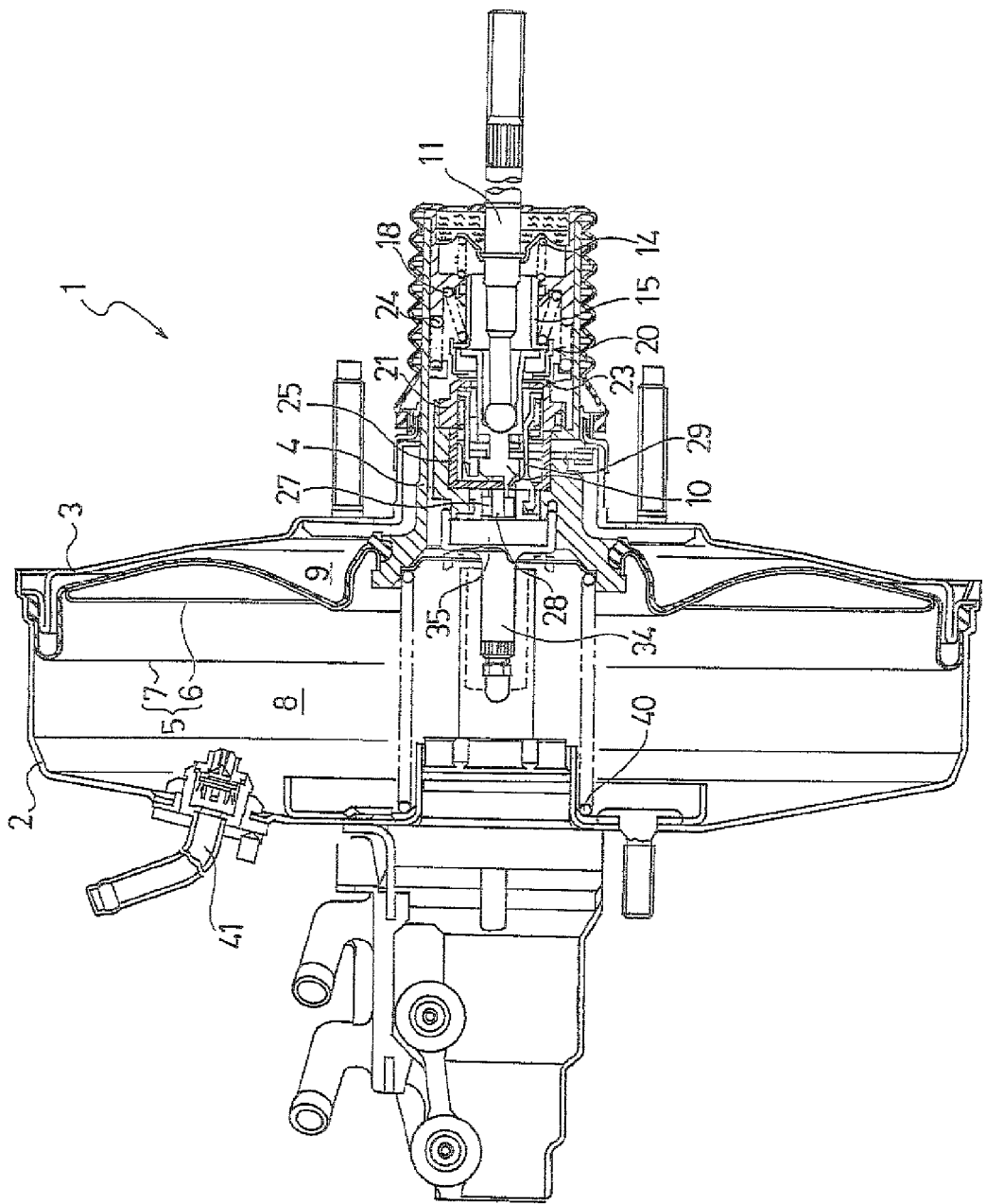
FIG. 1 is a sectional view illustrating a negative pressure booster which is inoperative condition according to a first embodiment of the invention.
Figure 2:
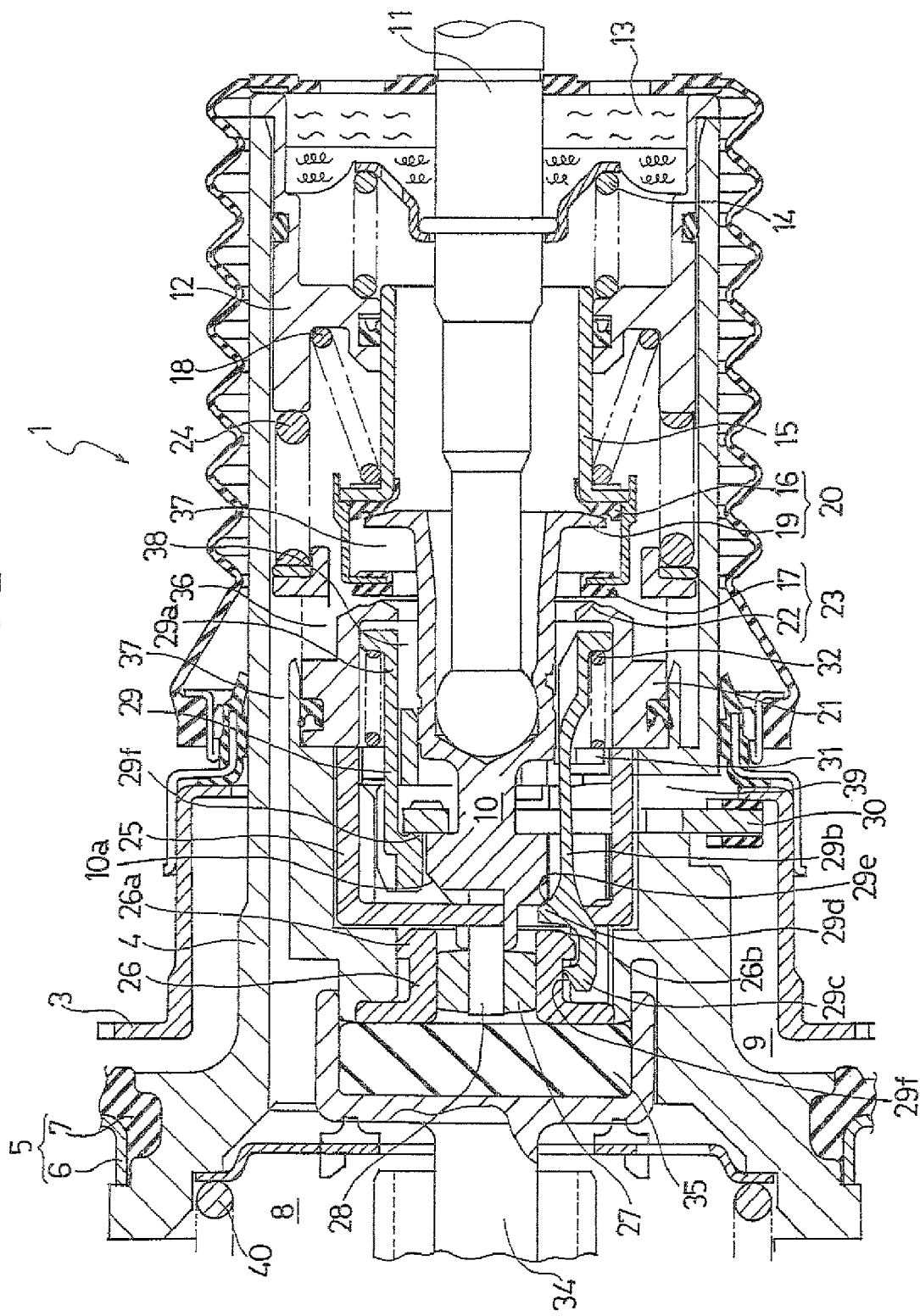
FIG. 2 is a sectional view illustrating, on an enlarged scale, portions of a vacuum valve and an atmosphere valve according the first embodiment shown in FIG. 1.

FIG. 1 is a sectional view illustrating a first embodiment of a negative pressure booster which is inoperative condition according to the invention, and FIG. 2 is a sectional view illustrating, on an enlarged scale, portions of a vacuum valve and an atmosphere valve of the first embodiment. In the following description, "front" and "back" stand for "left" and "right" in the drawings, respectively. Further, the following description deals with a case where the negative pressure booster of the first embodiment is applied to a brake system.

As shown in FIGS. 1 and 2, the negative pressure booster 1 of the first embodiment includes a front shell 2 and a rear shell 3 which are air-tightly coupled together to form an internal space. A cylindrical valve body 4 air-tightly penetrates through the rear shell 3, and the front end thereof is entering into the internal space while the rear end thereof is positioned on the exterior.

A power piston 5 is arranged in the internal space, the power piston 5 comprising a power piston member 6 mounted on the valve body 4, the valve body 4, and a diaphragm 7 provided between the two shells 2 and 3. The power piston 5 partitions the internal space in the two shells 2 and 3 into a constant pressure chamber 8 into which a negative pressure is introduced at all times and a variable pressure chamber 9 into which the atmospheric pressure is introduced at the time of operation.

In the valve body 4, a valve plunger (corresponds to the input member of the invention) 10 is arranged in concentric with the valve body 4 and is supported by the valve body 4 so as to slide in the back-and-forth direction. Further, an input shaft (corresponds to the input member of the invention) 11 for controlling the operation of the valve plunger 10 is coupled to the valve plunger 10, and the rear end of the input shaft 11 is coupled to a brake pedal that is not shown. A cylindrical retainer member 12 is fixed to the rear end portion of the valve body 4, and the input shaft 11 is supported by the retainer member 12 via a filter member 13 so as to slide in the back-and-forth direction. In this case, the input shaft 11 is urged backward at all times, i.e., in the inoperative direction by a return spring 14 supported between the input shaft 11 and the retainer member 12.

The retainer member 12 supports a cylindrical valve body 15 (the valve member of the invention) air-tightly so as to slide in the back-and-forth direction, the valve body 15 forming an atmosphere valve portion 16 and a vacuum valve portion 17. The valve body 15 is urged forward at all times, i.e., in the direction of operation by a first valve control spring 18 supported between the valve body 15 and the retainer member 12. The atmosphere valve portion 16 can be detachably seated on an atmosphere valve seat 19 formed at the rear end of the valve plunger 10, and an atmosphere valve 20 is constituted by the atmosphere valve portion 16 and the atmosphere valve seat 19.

Further, the valve body 4 supports a cylindrical vacuum valve seat member 21 air-tightly so as to slide in the back-and-forth direction, and a vacuum valve seat 22 is formed at the rear end of the vacuum valve seat member 21. The vacuum valve portion 17 can be detachably seated on the vacuum valve seat 22, and a vacuum valve 23 is constituted by the vacuum valve portion 17 and the vacuum valve seat 22. The vacuum valve seat member 21 is urged forward at all times, i.e., in the inoperative direction by a second valve control spring 24 which is the vacuum valve seat member supported between the vacuum valve seat member 21 and the retainer member 12.

Further, the valve body 4 supports an arm 25 of a U-shape in cross section (corresponds to a force transmission member and to an intermediate force transmission member of the invention) so as to slide in the back-and-forth direction, and the rear end of the arm 25 is in contact with the vacuum valve seat member 21. Therefore, the arm 25 is urged forward at all times to the vacuum valve seat member 21 that has been urged forward by the second valve control spring 24.

A cylindrical holder 26 is fixed to the front end of the valve body 4 integrally with the valve body 4, and a gap member 27 is provided in the holder 26 so as to slide in the back-and-forth direction. The front end portion of the valve plunger 10 is penetrating through the arm 25 so as to slide, and the front end of the valve plunger 10 is coming in contact with the gap member 27. A pin 28 (corresponds to the force transfer member of the invention) penetrates through an axial direction hole perforated through the center of the gap member 27 in the back-and-forth direction and slides therein. The rear end portion of the pin 28 is supported by the front end portion of the valve plunger 10 so as to slide, and the rear end of the pin 28 is in contact with the front end of the arm 25. When the negative pressure booster 1 is not in operation, the front end of the pin 28 is protruding forward by a predetermined amount slightly beyond the front end of the gap member 27. The pin 28 does not have to be provided necessarily at the center of the gap member 27 but may be provided at a position deviated from the center of the gap member 27.

Further, the valve body 4 supports a cylindrical valve operation member 29 so as to slide in the back-and-forth direction. The valve operation member 29 includes a cylindrical slide portion 29a slidably supported by the valve body 4 and by the vacuum valve seat member 21, and an engaging arm portion 29b extending forward from the cylindrical slide portion 29a and can be bent and resiliently deformed. The engaging arm portion 29b has the cylindrical slide portion 29a as the proximal end, is formed in a cantilevered manner having a flexural resilience, and has a hook portion 29c formed at its free end. In this case, the hook portion 29c penetrates through the arm 25 so as to move relative thereto in the back-and-forth direction, and is positioned ahead of the arm 25.

Further, the engaging arm portion 29b between the cylindrical slide portion 29a and the hook portion 29c is forming a protruded portion 29d protruding inwards, and the rear surface of the protruded portion 29d serves as a to-be-pushed surface 29e forming a tapered surface tilted backward toward the outer side. A stopper portion 29f that can come in contact with a key member 30 is formed in the inner circumferential side of the valve operation member 29.

The rear end of the valve operation member 29 is allowed to come in contact with the rear end portion of the vacuum valve seat member 21. A spring 32 is provided contracted between a retainer 31 provided in the valve body 4 and the rear end portion of the valve operation member 29. The spring force of the spring 32 urges the valve operation member 29 backward at all times.

A hook portion 26a is formed on the outer circumference of the rear end portion of the holder 26 and comes into engagement in the axial direction with the hook portion 29c on the side of the engaging arm portion 29b. When the negative pressure booster 1 is not in operation, the engaging surface at the front end of the hook portion 26a and the engaging surface at the rear end of the hook portion 29c are separated away by a predetermined distance in the axial direction; i.e., the two hook portions 26a and 29c are so set as will not come into engagement with each other in the axial direction.

The valve plunger 10 has a pushing surface 10a which is a tapered surface of a frustoconical shape tilted rearward toward the outer circumference and being opposed to the to-be-pushed surface 29e of the valve operation member 29 in the axial direction. When the valve plunger 10 moves forward relative to the valve operation member 29, the pushing surface 10a of the valve plunger 10 comes in contact with the to-be-pushed surface 29e of the valve operation member 29 so as to push the to-be-pushed surface 29e.

Since the pushing surface 10a and the to-be-pushed surface 29e are forming tapered surfaces as described above, a wedge effect is produced when the to-be-pushed surface 29e is pushed by the pushing surface 10a. Due to the wedge effect, the engaging arm portion 29b is bent and resiliently deflected outward (downward in FIG. 2). The deflection of the engaging arm portion 29b permits the hook portion 26a on the holder side which has been engaged in the axial direction to be disengaged from the hook portion 29c on the side of the engaging arm portion in the axial direction. As the two hook portions 26a and 29c disengage from each other in the axial direction as described above, the spring force of the spring 32 causes the valve operation member 29 to move backward relative to the valve body 4 and to come in contact with the vacuum valve seat member 21. The vacuum valve seat member 21 that is pushed backward causes the valve body 15 to be pushed up backward via the vacuum valve portion 17. The state where the two hook portions 26a and 29c are disengaged from each other and the vacuum valve seat member 21 is pushing up the valve body 15 backward, is a state of the brake assist (BA) operation. Therefore, the position, relative to the valve operation member 29, of the valve plunger 10 at where the two hook portions 26a and 29c are disengaged from each other, is a threshold position for starting the BA operation. The position of the valve plunger 10 relative to the valve operation member 29 at the start of the BA operation, can be controlled by the amount of deflection of reaction disc 35 produced by the pushing force of the valve plunger 10 which pushes the reaction disc 35 via the gap member 27.

As described above, the quick output increasing means of the invention is constituted by the slide portion 29a, engaging arm portion 29b, two hook portions 26a and 29c, surface 29e of the protruding portion 29d, pushing surface 10a of the valve plunger 10 and spring 32.

An output shaft 34 for operating the piston of the master cylinder that is not shown is provided at the front end portion of the valve body 4 in concentric with the valve body 4 and so as to slide in the back-and-forth direction like the conventional generally employed negative pressure booster. The reaction disc 35 which is reaction means is arranged between the front end of the output shaft 34 or the valve body 4 and the front end of the holder 26. When the negative pressure booster 1 is in operation, the reaction disc 35 transmits a force to the brake pedal via the gap member 27, valve plunger 10 and input shaft 11, the force being proportional to the reaction that is produced as the reaction from the output shaft 34 is resiliently deflected. When the negative pressure booster 1 is in operation, further, the reaction disc 35 deflects due to the reaction from the output shaft 34 and comes in contact with the pin 28. Therefore, the pin 28 is pushed backward upon receiving a force based on the pressure produced by the deflection of the reaction disc 35.

Accordingly, the arm 25 receives a force from the pin 28 and pushes the vacuum valve seat member 21 backward. If the force for pushing the vacuum valve seat member 21 by the arm 25 becomes greater than the sum of the urging force of the first valve control spring 18 and the urging force of the second valve control spring 24, the first and second valve control springs 18 and 24 both contract, and the vacuum valve seat member 21 backwardly pushes up the valve body 15 of which the vacuum valve portion 17 is seated on the vacuum valve seat 22 of the vacuum valve seat member 21. Therefore, the atmosphere valve portion 16 moves backward relative to the valve body 4 so as to separate away from the atmosphere valve seat 19, and the atmosphere flows into the variable pressure chamber 9 until the atmosphere valve 20 is closed to attain balance (vacuum valve 23 has been closed already). Therefore, the balance position for the atmosphere valve 20 and the vacuum valve shifts backward (toward the input side) relative to the valve body 4, whereby a distance (gap) between the reaction disc 35 and the gap member 27 as well as a distance (gap) between the gap member 27 and the valve plunger 10 increase, i.e., the distance (gap) between the reaction disc 35 and the valve plunger 10 (or input shaft 11)

increases with an increase in the input and the distance (gap) increases depending on the input, so that the output increases.

Figure 3:
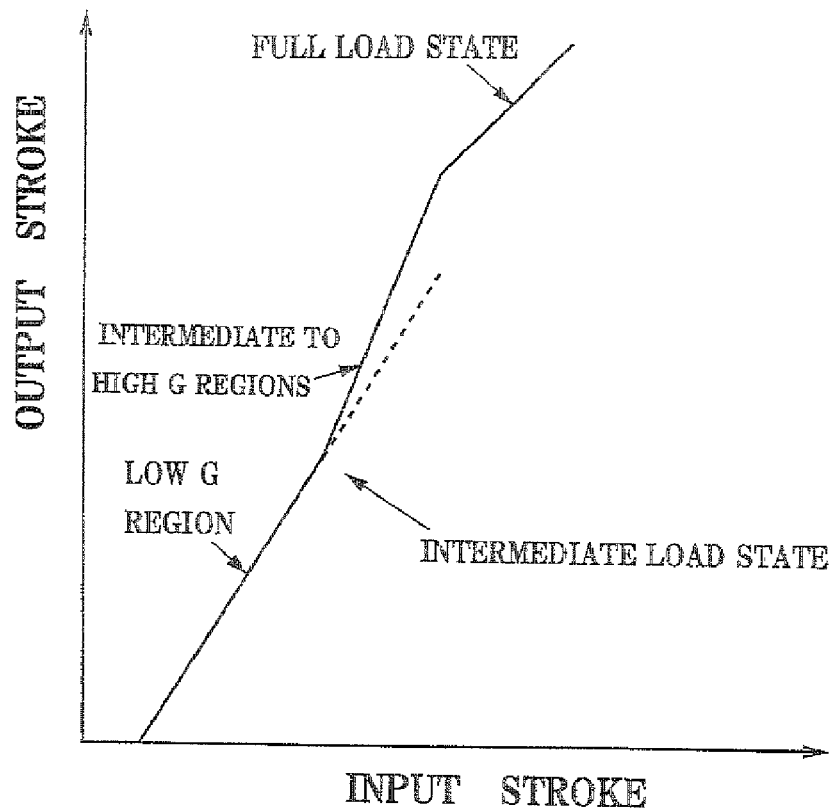
FIG. 3 is a diagram illustrating input/output stroke characteristics of the negative pressure booster shown in FIG. 1.
Figure 4:
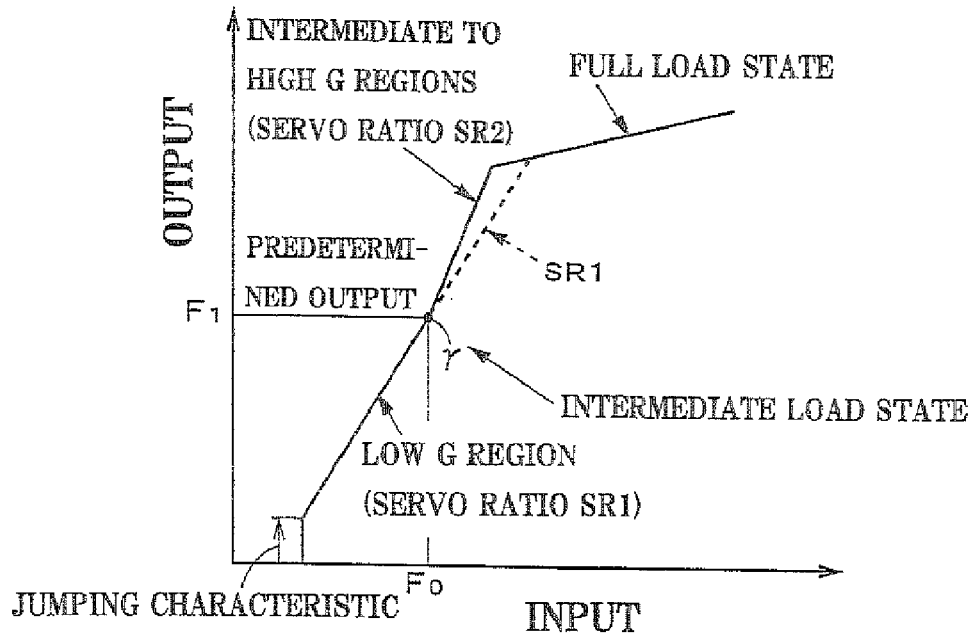
FIG. 4 is a diagram illustrating input/output characteristics of the negative pressure booster shown in FIG. 1.

Therefore, the negative pressure booster 1 of this embodiment has input/output stroke characteristics as shown in FIG. 3 like the negative pressure booster disclosed in the patent document 1 and, also, has input/output characteristics as shown in FIG. 4. Details of the input/output stroke characteristics and the input/output characteristics will be easily understood from the description of the patent document 1 and from the above description of the prior art, but are briefly described below.

That is, as shown in FIG. 3, the input/output stroke characteristics are such that the output stroke to the input stroke in the intermediate to high deceleration regions (intermediate to high G regions) becomes greater than the output stroke to the input stroke in the low deceleration region (low G region) In other words, in the intermediate to high decelerations region (intermediate to high G regions), the input stroke needs be small for producing the same output and is, therefore, regarded to be shortened.

As for the input/output characteristics as shown in FIG. 4, further, in the low G region where the output of the negative pressure booster 1 is smaller than a predetermined output $F_1$, the vacuum valve seat member 21 does not move relative to the valve body 4. Therefore, the balance position at where the vacuum valve 23 and the atmosphere valve 20 are both closed, does not shift relative to the valve body 4, and the brake can be normally applied with the same input. In the low G region, therefore, a relatively small servo ratio SR1 is obtained which is the same as the servo ratio of when the brake is normally applied in a customary manner. In the intermediate to high G regions where the output of the negative pressure booster 1 exceeds the predetermined output $F_1$ on the other hand, the vacuum valve seat member 21 moves backward (toward the input side) relative to the valve body 4, and the balance position shifts backward (toward the input side) relative to the valve body 4 depending on the input. Therefore, a servo ratio SR2 becomes greater than the servo ratio SR1 that is set in the low G region when the brake is normally applied in a customary manner (SR2>SR1). In the intermediate to high output regions (intermediate to high G regions), the input is relatively large, and the deceleration by the brake is set to be those of the intermediate to high deceleration (intermediate and high G) regions for the vehicles of relatively large weights (inclusive of live load).

The large servo ratio SR2 will now be described in detail The negative pressure booster 1 of this embodiment is the same as the negative pressure booster disclosed in the International Laid-Open WO 2004/101340 described above, and the servo ratio SR2 is obtained as described below. That is, as described above, the balance position for the atmosphere valve 20 and the vacuum valve 23 is slightly shifted backward relative to the valve body 4, and the pressure in the variable pressure chamber 9 is elevated to slightly jump up the output. The output is jumped up repetitively in the state of the servo ratio SR1; i.e., the output is increased stepwise in microscopically small amounts to obtain the servo ratio SR2 which is apparently (macroscopically) larger than the servo ratio SR1.

In order for the arm 25 to move the vacuum valve seat member 21 and the valve body 15 backward relative to the valve body 4, the force of the arm 25 pushing the vacuum valve seat member 21 must be greater than the sum (i.e., predetermined value) of the urging force of the first valve control spring 18 and the urging force of the second valve control spring 24. In the negative pressure booster 1 of this example, therefore, the set spring loads and the spring constants of the first and second valve control springs 18 and 24 are so set that the pushing force of the arm 25 becomes larger than the sum of the urging force of the first valve control spring 18 and the urging force of the second valve control spring 24.

In this case, the set spring load and spring constant of the first valve control spring 18 are values specific to the negative pressure booster 1, and are set to be very smaller than the set spring load of the second valve control spring 24. Therefore, the pushing force of the arm 25 for moving the vacuum valve seat member 21 and the valve body 15 backward is chiefly determined by the set spring load and the spring constant of the second valve control spring 24. Both the spring constant and the set spring load of the second valve control spring 24 for urging the vacuum valve seat member 21 can be arbitrarily set. That is, in the input/output characteristics shown in FIG. 4, a preset input $F_0$ which is an input at a changing point (ratio point) γ at where the small servo ratio SR1 changes into the large servo ratio SR2, can be increased or decreased by varying the set spring load of the second valve control spring 24. Further, the servo ratio SR2 can be increased or decreased by varying the spring constant of the second valve control spring 24.

In the negative pressure booster 1 of this embodiment, therefore, the spring constant and the set spring load of the second valve control spring 24 can be set depending upon the vehicle on which it is mounted. Therefore, the one type of the negative pressure booster 1 can be easily and properly applied to various kinds of brake boosters to meet for various kinds of vehicles.

An annular chamber 36 formed along the outer circumference of the vacuum valve seat member 21 is communicated with the constant pressure chamber 8 at all times via a vacuum passage 37 formed in the valve body 4, and an annular chamber 37 formed along the outer circumference of the rear end portion of the valve plunger 10 is communicated with the variable pressure chamber 9 at all times via atmosphere/vacuum passages 33, 39 formed in the valve body 4.

In FIGS. 1 and 2, reference numeral 40 denotes a return spring of the power piston 5, and reference numeral 41 denotes a negative pressure introduction port which is connected to a source of negative pressure that is not shown for introducing a negative pressure into the constant pressure chamber 8.

The operation of the thus constituted negative pressure booster 1 of this embodiment will now be described.
(When not in Operation)

When not in operation, the negative pressure booster 1 assumes a state as shown in FIGS. 1 and 2. In this state, the valve body 4 is at the inoperative position which is the rear limit since the key member 30 comes in contact with the rear shell 3. Therefore, the power piston 5 and the output shaft 34 are at the inoperative positions. Due to the key member 30, further, the valve plunger 10 is limited to the inoperative position which is the rear limit, and the input shaft 11, too, is limited to the inoperative position.

Due to the key member 30, further, the valve operation member 29 is limited to the inoperative position which is the rear limit. Further, the arm 25 is limited to the inoperative position which is the front limit due to the valve operation member 29 at the inoperative position, and the vacuum valve seat member 21, too, is limited to the inoperative position which is the front limit due to the arm 25.

When the negative pressure booster 1 is inoperative condition, the atmosphere valve 20 is closed, the vacuum valve 23 is opened, the variable pressure chamber 9 is shut off the atmosphere but is communicated with the constant pressure chamber 8 into which the negative pressure is introduced at all times. Therefore, the negative pressure is introduced into the variable pressure chamber 9, too, and the pressure therein is equal to the pressure in the constant pressure chamber 8 or is slightly higher than the pressure in the constant pressure chamber 8. Further, the reaction disc 35 is not deflected, and both the front end of the pin 28 and the front end of the gap member 27 are not in contact with the reaction disc 35. Moreover, the two hook portions 26a and 29c are separated apart in the axial direction and are not engaged with each other. The pushing surface 10a and the to-be-pushed surface 29e, too, are separated apart in the axial direction and are not contact with each other.

(Normal Braking Operation by the Negative Pressure Booster in the Low Deceleration Region)

When the brake pedal is depressed at a depressing rate in the normal braking operation to normally apply the brake, the input shaft moves forward and the valve plunger 10 moves forward. As the valve plunger 10 moves forward, the vacuum valve portion 17 of the valve body 15 is seated on the vacuum valve seat 22, whereby the vacuum valve 23 is closed, and the atmosphere valve seat 19 separates away from the atmosphere valve portion 16 of the valve body 15, and the atmosphere valve 20 opens. That is, the variable pressure chamber 9 is shut off from the constant pressure chamber 8 and is communicated with the atmosphere. Therefore, the atmosphere is introduced into the variable pressure chamber 9 through the atmosphere valve 20 that is opened and through the atmosphere/vacuum passages 38 and 39. As a result, a pressure differential occurs between the variable pressure chamber 9 and the constant pressure chamber 8, the power piston 5 and the valve body 4 move forward, the output shaft 34 moves forward via the valve body 4, and a piton moves forward in a master cylinder that is not shown.

The gap member 27, too, moves forward accompanying the valve plunger 10 that has moved forward, but does not still come in contact with the reaction disc 23 due to the gap. Therefore, the reaction of the output shaft 34 is not transmitted to the gap member 27 from the reaction disc 35; i.e., the reaction is not transmitted to the brake pedal, either, through the valve plunger 10 and the input shaft 11. Moreover, the holder 26 moves forward accompanying the valve body 4 that has moved forward, and the hook portion 26a of the holder 26 comes into engagement of the hook portion 29c of the valve operation member 29 in the axial direction. Thereafter, accompanying the valve body 4 that has moved forward, the valve operation member 29 moves forward integrally therewith. At this moment, the pushing surface 10a of the valve plunger 10 does not come in contact with the to-be-pushed surface 29e of the valve operation member 29, and both hook portions 26a and 29c are maintained engaged together. As the input shaft 11 further moves forward, the power piston 5 further moves forward, and the piston further moves forward in the master cylinder via the valve body 4 and the output shaft 34.

The master cylinder sends the brake fluid to the wheel cylinders that are not shown. When the master cylinder produces a hydraulic pressure, the reaction is transmitted from the output shaft 34 to the reaction disc 35 which, therefore, is elastically deflected. The reaction disc 35 that is deflected comes, first, into contact with the pin 28 and pushes the pin 28 backward. Due to the pin 28 that is pushed, the vacuum valve seat member 21 is pushed backward via the arm 25. Here, since the pressure due to the deflection of the reaction disc 35 pushes the pin 28, the pushing force of the pin 28 varies in proportion to the diameter (i.e., sectional area) of the pin 28.

In the low output region where the negative pressure booster 1 produces a small output, the backward pushing force of the vacuum valve seat member 21 due to the deflection pressure of the reaction disc 35 is smaller than the sum of the urging force of the second valve control spring 24 and the urging force of the first valve control spring 18. Therefore, he vacuum valve seat member 21 does not move relative to the valve body 4.

Loss stroke in the brake system disappears after the master cylinder and, therefore, the negative pressure booster 1 substantially produces an output. Based on this output, the master cylinder produces a master cylinder pressure (hydraulic pressure), and the wheel cylinders operate due to the master cylinder pressure to produce a braking force.

Here, due to the reaction applied to the output shaft 34 from the master cylinder, the reaction disc 35 further expands backward, whereby the gap disappears and the reaction disc 35 comes in contact with the gap member 27. Therefore, the reaction from the output shaft 34 is transmitted from the reaction disc 35 to the gap member 27, and is, further, transmitted to the brake pedal via the valve plunger 10 and the input shaft 11, and is perceived by the driver. That is, as shown in FIG. 4, the negative pressure booster 1 exhibits jumping characteristics of when the brake is normally applied. The jumping characteristics are nearly the same as the jumping characteristics of a conventional general negative pressure booster.

When the brake is normally applied in the low deceleration (low G) region, the input (i.e., pedal depressing force) to the negative pressure booster 1 is relatively small. In the low deceleration (low G) region, the output is smaller than the predetermined output $F_1$, the vacuum valve seat member 21 does not move, and the servo ratio becomes a relatively small servo ratio SR1 nearly like that of when the brake is normally applied in a customary manner. Therefore, if the output of the negative pressure booster 1 becomes equal to a value obtained by boosting the input of the input shaft 11 due to the pedal depressing force by the servo ratio SR1, the atmosphere valve portion 16 is seated on the atmosphere valve seat 19, whereby the atmosphere valve 20 is closed to establish a state where the intermediate load is balanced (the vacuum valve 23 is closed already with the vacuum valve portion 17 being seated on the vacuum valve seat 22). In the low deceleration (low G) region as shown in FIG. 4, therefore, the brake is normally applied with a braking force obtained by boosting the pedal depressing force of when the brake is normally applied by the servo ratio SR1.

(Releasing the Normal Braking Operation of the Negative Pressure Booster in the Low Deceleration Region)

In order to release the normal brake, if the brake pedal is released in a state where the atmosphere valve 20 and the vacuum valve 23 of the negative pressure booster 1 are both closed while normally applying the brake, both the input shaft 11 and the valve plunger 10 move back. However, the valve body 4 and the vacuum valve seat member 21 do not readily move back since the air (atmosphere) has been introduced into the variable pressure chamber 9. Therefore, the atmosphere valve seat 19 of the valve plunger 10 pushes the atmosphere valve portion 16 of the valve body 15 backward, whereby the vacuum valve portion 17 separates away from the vacuum valve seat 22, and the vacuum valve 23 opens. The air introduced into the variable pressure chamber 9, therefore, is exhausted to the vacuum source through the opened vacuum valve 23, vacuum passage 37, constant pressure chamber 8 and negative pressure introduction port 41.

Therefore, the pressure decreases in the variable pressure chamber 9, the pressure differential decreases between the variable pressure chamber 9 and the constant pressure chamber 8, and the spring force of the return spring 25 causes the power piston 5, valve body 4 and output shaft 34 to move back. Accompanying the valve body 4 that moves back, the piston in the master cylinder and the output shaft 34 move back, too, due to the spring force of the return spring of the piston in the master cylinder, and the normal brake starts to be released.

Referring to FIG. 1, the key member 30 comes in contact with the rear shell 3; i.e., the key member 30 stops and does not move back any more. However, the valve body 4, vacuum valve seat member 21, valve plunger 10 and input shaft 11 further move back. Thereafter, the valve plunger 10 comes in contact with the key member 30 as shown in FIG. 2, the front end of key groove of the valve body 4 comes in contact with the key member 30 as shown in FIG. 2, and the valve plunger 10 and the valve body 4 do not move back any more. Thus, the negative pressure booster 1 assumes the initial state of inoperative condition shown in FIGS. 1 and 2. Accordingly, the master cylinder and the wheel cylinders, too, assume the state of inoperative condition, and the normal brake is released.

(Normal Braking Operation of the Negative Pressure Booster in the Intermediate to High Deceleration Regions)

When the brake is normally applied in the intermediate to high deceleration regions where the deceleration is greater than that of when the brake is normally applied in the low deceleration (low G) region, the input (i.e., pedal depressing force) to the negative pressure booster 1 is set to be larger than that of when the brake is normally applied in the low deceleration (low G) region. When the input increases and exceeds a preset input $F_0$ as shown in FIG. 4, the input/output characteristics of the negative pressure booster 1 become those in the intermediate to high deceleration (intermediate to high G) regions, whereby the servo ratio is switched over to a large servo ratio SR2, and the output becomes greater than a predetermined output.

If concretely described, with the preset input $F_0$, the negative pressure booster 1 produces a predetermined output $F_1$. Therefore, the force of the reaction disc 35 based on the reaction of the output shaft 34 for pushing the vacuum valve seat member 21 via the pin 28 and arm 25, becomes greater than a predetermined value which is based on the spring forces of the first and second valve control springs 18 and 24. Accordingly, the vacuum valve seat member 21 moves backward while pushing the valve body 15 to the valve body 4. Accordingly, the atmosphere valve portion 16 separates away from the atmosphere valve seat 19, and the atmosphere valve 20 opens more greatly than when the brake is normally applied in the low G region. In the intermediate to high G regions as shown in FIG. 4, therefore, the servo ratio becomes a servo ratio SR2 larger than that of when the brake is normally applied in the prior art. That is, when the output of the negative pressure booster 1 becomes equal to the input of the input shaft 11 boosted at the servo ratio SR2, the atmosphere valve portion 16 is seated on the atmosphere valve seat 19 in the same manner as described above, and the atmosphere valve 20, too, is closed to establish a state where the intermediate load is balanced (the vacuum valve 23 has been closed already since the vacuum valve portion 17 is seated on the vacuum valve seat 22). In the intermediate to high deceleration (intermediate to high G) regions, therefore, the brake is applied with a force larger than that of when the brake is normally applied in the low deceleration (low G) region since the pedal depressing force is boosted at the servo ratio SR2. In the intermediate to high deceleration (intermediate to high G) regions in this case, the negative pressure booster 1 receives a large pedal depressing force; i.e., an output larger than that of when the brake is normally applied is obtained despite of the same input as that of when the brake is normally applied at the servo ratio SR1.

When in operation in the intermediate to high deceleration (intermediate to high G) regions, further, the vacuum valve seat member 21 moves backward relative to the valve body 4 more than in the operation in the low deceleration (low G) region like the negative pressure booster disclosed in the above-mentioned International Laid-Open WO 2004/101340. Therefore, the output stroke increases correspondingly to the above moving amount. In other words, when the same output stroke is to be obtained as shown in FIG. 3, the input stroke quantity in the intermediate to high deceleration (intermediate to high G) regions represented by a solid line in FIG. 4 becomes smaller, by the stroke quantity, than the input stroke quantity of when it has varied at a rate of change (inclination) of the input stroke relative to the output stroke of during the normal operation at the servo ratio SR1 in the low deceleration (low G) region represented by a dotted line in FIG. 4. This shortens the stroke of the input shaft 11, i.e., shortens the stroke of the brake pedal.

(Releasing the Normal Braking Operation of the Negative Pressure Booster in the Intermediate to High Deceleration Regions)

When the brake pedal is released to release the normal braking in the state where the atmosphere valve 20 and the vacuum valve 23 of the negative pressure booster 1 are both closed while the vacuum valve seat member 21 is in operation, the vacuum valve 23 is opened in the same manner as described above, and the air introduced into the variable pressure chamber 9 is exhausted into the vacuum source through the atmosphere/vacuum passages 39, 38, vacuum valve 23 that is opened, vacuum passage 37, constant pressure chamber 8 and negative pressure introduction port 41.

Therefore, the pressure decreases in the variable pressure chamber 9 in the same manner as described above, and the power piston 5, valve body 4 and output shaft 34 move back due to the spring force of the return spring 40. Accompanying the valve body 4 that moves back, the piston in the master cylinder and the output shaft 34, too, move back due to the spring force of the return spring of piston in the master cylinder, and the brake starts to be released.

As the reaction from the output shaft 34 decreases, the force for pushing the vacuum valve seat member 21 via the arm 25 becomes smaller than the spring forces of the first and second valve control springs 18 and 24, and the vacuum valve seat member 21 moves forward relative to the valve body 4. Thereafter, the front end of the vacuum valve seat member 21 comes in contact with the valve body 4 as shown in FIG. 2, and the vacuum valve seat member 21 is brought to the inoperative position, and the arm 25 and the pin 28, too, are brought to the inoperative positions. Therefore, the vacuum valve seat 22 is greatly separated away from the vacuum valve portion 17 permitting the vacuum valve 23 to be greatly opened. Therefore, the air in the variable pressure chamber 9 is much discharged to establish the state of normally applying the brake in the low deceleration (low G) region. The subsequent operations are the same as those of when the brake is normally applied in the low deceleration (low G) region described above, the members that have finally moved in the negative pressure booster 1 are all brought to the inoperative positions shown in FIG. 2, and releasing the brake from being applied with an input larger than that of normally applying the brake in the low deceleration (low G) region.

(Emergency Braking Operation)

In order to apply the emergency brake, if the brake pedal is depressed at a depressing rate larger than that of when normally applying the brake and with a pedal depressing force larger than that of when normally applying the brake, the vacuum valve 23 is closed, the atmosphere valve 20 is opened, the atmosphere is introduced into the variable pressure chamber 9, and the negative pressure booster 1 produces an output like when the brake is normally applied as described above. The hook portion 26a of the holder 26 engages with the hook portion 29c of the valve operation member 29 in the axial direction like when the brake is normally applied as described above. In this case, however, the input shaft 11 and the valve plunger 10 move forward relative to the valve body 4 by strokes greater than those of when the brake is normally applied. Therefore, the pushing surface 10a of the valve plunger 10 comes in contact with the to-be-pushed surface 29e of the valve operation member 29 to thereby push the to-be-pushed surface 29e. Due to the wedge effect on the tapered surfaces of the pushing surface 10a and the to-be-pushed surface 29e, therefore, a protruded portion 29d is pushed in a direction in which it opens (downward in FIG. 2), and an engaging arm portion 29b is resiliently bent and deformed (deflected). Therefore, the hook portion 29c disengages from the hook portion 26a; i.e., the hook portion 29c and the hook portion 26a are disengaged from each other, and the valve operation member 29 moves backward being urged by the spring 32.

Thereafter, the valve operation member 29 comes in contact with the rear end portion of the vacuum valve seat member 21 to push the vacuum valve seat member 21 backward. Namely, the vacuum valve seat member 21 pushes the valve body 15 backward, and the valve 15 moves backward relative to the valve body 4. When the emergency brake is applied, the valve body 15 is pushed up backward by the vacuum valve seat member 21 in a manner different from that of when the brake is normally applied as described above. Namely, the valve body 15 starts being pushed up backward while the force of the vacuum valve seat member 21 for pushing the valve body 15 due to the reaction from the output shaft 34 is still smaller than the spring forces of the first and second valve control springs 18 and 24. Therefore, the above-mentioned balance position quickly shifts backward as compared to when the brake is normally applied, the negative pressure booster 1 is quickly set to the large servo ratio SR2 to produce a large output with a smaller pedal stroke. As a result, a large braking force is obtained.
(Releasing the Emergency Brake)

After having applied the emergency brake, if the brake pedal is released, the brake is released basically in the same manner as when the brake is normally operated as described above. In the case of releasing the emergency brake, however, if the valve body 4 moves backward, the tapered surface 26b formed at the rear end of the hook portion 26a comes in contact with the tapered surface 29f formed at the front end of the hook portion 29c, and the hook portion 29c is pushed in a direction in which it opens (downward in FIG. 2) due to the wedge effect of the tapered surface. Therefore, the engaging arm portion 29b is resiliently bent and deformed permitting the hook portion 26a to pass through the hook portion 29c so as to be positioned at the back of the hook portion 29c. The engaging arm portion 29b, thereafter, resiliently returns. Thus, the negative pressure booster 1 assumes the inoperative condition shown in FIGS. 1 and 2.

According to the negative pressure booster 1 which is applied to the brake system as described above, in obtaining a large stroke of the output shaft 34 in the intermediate to high deceleration (intermediate to high G) regions, it is made possible to shorten the stroke quantity of the input shaft 11 as compared to the stroke quantity necessary for obtaining the large stroke when the stroke quantity of the input shaft 11 is changed at a change rate of the operation stroke quantity of the input shaft with respect to the output in the low deceleration (low G) region. Accordingly, in obtaining the deceleration larger than the deceleration of when the brake is normally applied in the low deceleration (low G) region, it is made possible to obtain a desired large deceleration with a pedal depressing amount which is smaller than the amount the brake pedal is depressed for obtaining the large deceleration with the servo ratio SR1 of when the brake is normally applied in the low deceleration (low G) region. Accordingly, the brake feeling can be more effectively improved for those vehicles having large weights that require a larger braking force when the brake is normally operated in the intermediate to high deceleration (intermediate to high G) regions than the braking force of when the brake is normally applied in the low deceleration (low G) region.

Upon suitably adjusting the set spring load of the second valve control spring 24, further, it is allowed to set the operation start timing of the vacuum valve seat member 21 (i.e., servo ratio switching timing) to a desired timing. This makes it possible to flexibly and easily cope with the negative pressure boosters 1 having various required input and output characteristics.

Further, the vacuum valve seat member 21 is operated by the pin 28 and arm 25 that are urged by the deflection of the reaction disc 35 using the reaction of the output shaft 34. Namely, the vacuum valve seat member 21 moves reliably, and can be controlled reliably and easily. Besides, the structure for operating the vacuum valve seat member 21 can be simplified. In particular, by using the pin 28 as the force transmission member, the structure for operating the vacuum valve seat member 21 can be further simplified and can be obtained at a decreased cost.

Moreover, the vacuum valve seat member 21 that is moved by the pin 28 and arm 25, has no pressure-receiving area, and can be realized having a decreased diameter. Therefore, the valve body 4 needs have a decreased diameter, and the negative pressure booster 1 can be realized in a compact size as a whole.

Further, since the vacuum valve seat member 21 has no pressure-receiving area, it is allowed to correspondingly increase the sectional areas of the passages 37 and 38 formed in the valve body 4 and through which the air flows, and to improve the response.

Besides, what are required are to simply add some constituent parts such as pin 28, arm 25, vacuum valve seat member 21 and the like to the reaction disc 35, holder 26 and valve plunger 10 that have heretofore been employed in general negative pressure boosters. Therefore, the structure for operating the vacuum valve seat member 21 can be simplified and can be easily assembled at a decreased cost.

When the emergency brake is applied, further, the balance position for the atmosphere valve 20 and the vacuum valve 23 is quickly shifted backward relative to the valve body 4 to increase the servo ratio to be larger than that in the normal operation to thereby increase the output of the negative pressure booster 1. This makes it possible to effect the brake assist (BA) control when the emergency brake is applied, and to quickly and effectively apply the emergency brake. As described above, the pedal stroke of the brake pedal is shortened yet executing the BA control making it possible to improve the brake control.

Figure 5:
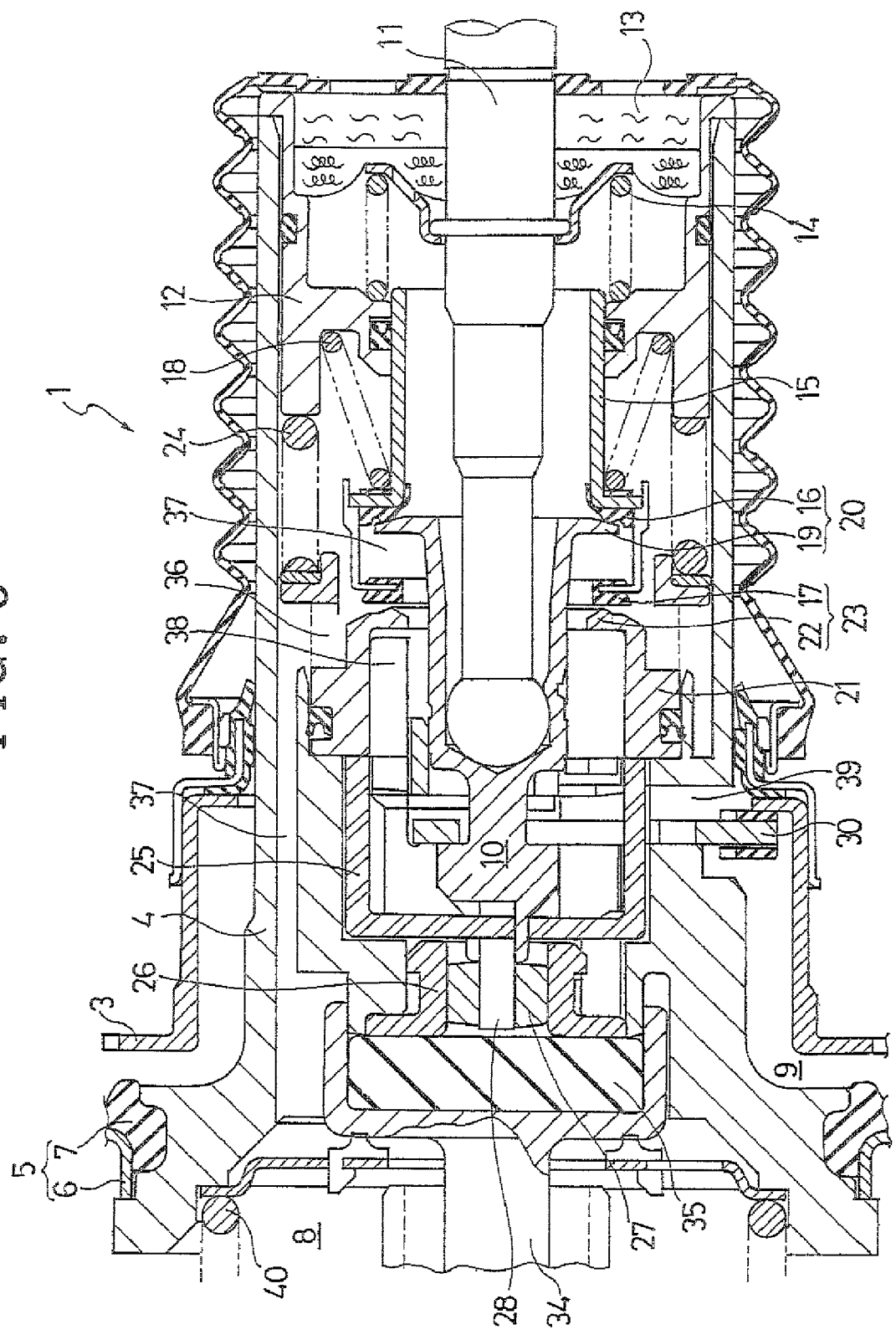
FIG. 5 is, like FIG. 2, a view illustrating the negative pressure booster according to a second embodiment of the invention.

FIG. 5 illustrates a second embodiment of the negative pressure booster of the invention, and is similar to FIG. 2. Here, the same constituent elements as those of the above first embodiment are denoted by the same reference numerals but are not described here again in detail. The following description deals with a case when the negative pressure booster is applied to the brake system like in the first embodiment.

In the above first embodiment, the negative pressure booster 1 has the BA function. However, the negative pressure booster 1 of the second embodiment has no BA function as shown in FIG. 5. Therefore, the negative pressure booster 1 of the second embodiment has neither the valve operation member 29 for executing the BA function nor the spring 32 for urging the valve operation member 29.

In other respects, the constitution of the negative pressure booster 1 of the second embodiment is the same as the constitution of the negative pressure booster 1 of the above first embodiment. Further, the negative pressure booster 1 of the second embodiment does not execute the BA operation at the time when the emergency brake is applied. Moreover, the effect of the negative pressure booster 1 of the second embodiment is the same as the effect of the negative pressure booster 1 of the above first embodiment but from which the effect of the BA control is removed.

In the above embodiments, the vacuum valve seat member 21 and the arm 25 are separately formed. However, the vacuum valve seat member 21 and the arm 25 may be formed integrally together.

INDUSTRIAL APPLICABILITY

The negative pressure booster of the present invention is applicable to a negative pressure booster used in a brake system and the like, and is, particularly, applicable to a negative pressure booster which, in a low output region (low deceleration region), obtains a relatively low output (deceleration G) with a relatively small servo ratio and, in a high output region (high deceleration region), obtains a relatively high output (deceleration G) with a servo ratio larger than the servo ratio in the low output region, making it possible to obtain a large output (deceleration G) with a small input (pedal depressing force) and to improve the pedal feeling by shortening the pedal stroke.

The invention claimed is:

1. A negative pressure booster comprising:
    a valve body arranged to move into and out of a space formed by a shell, and arranged to penetrate the shell in an air-tight and slidable manner;
    a power piston coupled to the valve body and dividing an interior of the space into a constant pressure chamber into which a negative pressure is introduced and a variable pressure chamber into which atmosphere is introduced when in operation;
    a valve plunger arranged in the valve body so as to move freely therein;
    an input shaft coupled to the valve plunger and is arranged so as to move into and out of the valve body;
    an output shaft which, due to the operation of the power piston, moves together with the valve body to produce an output reaction;
    a vacuum valve arranged in the valve body and is controlled by a forward or backward motion of the valve plunger to shut off or communicate a passage between the constant pressure chamber and the variable pressure chamber;
    an atmosphere valve arranged in the valve body and is controlled by the forward or backward motion of the valve plunger to communicate or shut off a passage between the variable pressure chamber and the atmosphere; and
    reaction means for transmitting the reaction from the output shaft to the valve plunger; wherein,
    the vacuum valve and the atmosphere valve have a common valve member, the vacuum valve has a vacuum valve portion provided in the valve member and a vacuum valve seat on which the vacuum valve portion can be detachably seated, and the atmosphere valve has an atmosphere valve portion provided in the valve member and an atmosphere valve seat provided in the valve plunger and on which the atmosphere valve portion can be detachably seated; wherein,
    the vacuum valve seat is provided on a vacuum valve seat member supported by the valve body so as to slide relative thereto;
    a force transmission member is provided so as to move relative to the valve body, the force transmission member directly pushing the vacuum valve seat member upon receiving a force produced by the reaction means in response to the reaction from the output shaft; and
    when a pushing force of the force transmission member is larger than a predetermined value, the vacuum valve seat member causes the valve body to open the atmosphere valve due to the pushing of the valve member by the pushing force from the force transmission member.

2. The negative pressure booster according to claim 1, further comprising vacuum valve seat member-urging means for urging the vacuum valve seat member with an urging force that opposes the pushing force of the force transmission member that pushes the vacuum valve seat member.

3. The negative pressure booster according to claim 2, wherein the reaction means includes a reaction disc that is deflected by the reaction of the output shaft to transmit the force to the valve plunger, and the force transmission member pushes the vacuum valve seat member upon receiving a force generated by the reaction disc that is deflected by the reaction from the output shaft.

4. The negative pressure booster according to claim 3, wherein the force transmission member comprises a pin that receives the force from the reaction disc, and an intermediate force transmission member that pushes the vacuum valve seat member upon receiving the force from the pin.

5. The negative pressure booster according to claim 2, further comprising quick output increasing means which, when the input shaft is operated quicker than when in normal operation, increases the output quicker than in the normal operation.

6. The negative pressure booster according to claim 1, wherein the reaction means includes a reaction disc that is deflected by the reaction of the output shaft to transmit the force to the valve plunger, and the force transmission member pushes the vacuum valve seat member upon receiving a force generated by the reaction disc that is deflected by the reaction from the output shaft.

7. The negative pressure booster according to claim 6, wherein the force transmission member comprises a pin that receives the force from the reaction disc, and an intermediate force transmission member that pushes the vacuum valve seat member upon receiving the force from the pin.

8. The negative pressure booster according to claim 1, further comprising quick output increasing means which, when the input shaft is operated quicker than when in normal operation, increases the output quicker than in the normal operation.

* * * * *